United States Patent [19]

Laval, Jr.

[11] 4,072,481
[45] Feb. 7, 1978

[54] DEVICE FOR SEPARATING MULTIPLE PHASE FLUID SYSTEMS ACCORDING TO THE RELATIVE SPECIFIC GRAVITIES OF THE PHASE

[76] Inventor: Claude C. Laval, Jr., 2444 N. Farris Ave., Fresno, Calif. 93705

[21] Appl. No.: 771,687

[22] Filed: Feb. 24, 1977

Related U.S. Application Data

[63] Continuation of Ser. No. 675,298, April 9, 1976, abandoned.

[51] Int. Cl.² .................... B01D 19/00; B04C 5/103
[52] U.S. Cl. ........................................ 55/177; 55/204; 55/459 R; 210/512 R
[58] Field of Search ................ 55/176, 177, 394, 448, 55/449, 455, 459 R, 459 A–459 D, 465, 204; 209/144, 211; 210/512 R

[56] References Cited

U.S. PATENT DOCUMENTS

| | | | |
|---|---|---|---|
| 2,756,878 | 7/1956 | Herkenhoff | 209/211 |
| 2,816,490 | 12/1957 | Boadway et al. | 210/512 R |
| 2,849,930 | 9/1958 | Freeman et al. | 55/177 X |
| 3,271,929 | 9/1966 | Bowden et al. | 210/512 R X |
| 3,289,608 | 12/1966 | Laval, Jr. | 210/512 R X |
| 3,425,545 | 2/1969 | Zemanek et al. | 209/211 X |
| 3,512,651 | 5/1970 | Laval, Jr. | 209/211 X |
| 3,696,934 | 10/1972 | Oisi | 210/512 R |
| 3,969,096 | 7/1976 | Richard | 55/455 |

Primary Examiner—Charles N. Hart
Assistant Examiner—Robert H. Spitzer
Attorney, Agent, or Firm—Huebner & Worrel

[57] ABSTRACT

A device for separating multiple phase fluid systems according to the relative specific gravities of the phase having a vortex chamber providing upper and lower ends and a circumscribing side wall, a supply conduit connected to the upper end of the chamber adapted to supply a fluid system to the chamber so as to cause it to swirl in the chamber to throw a heavier phase outwardly to descend in the chamber and to cause a lighter phase to move inwardly in the chamber, a tubular vortex finder extended in the upper end of the chamber about which said system is swirled having an open end in downwardly spaced relation to the upper end of the chamber through which a phase of intermediate specific gravity is discharged, a conduit connected to the lower end of the chamber to remove the heavier phase therefrom, a partition in the upper end of the chamber extended between the vortex finder and the wall of the chamber to define a collecting compartment thereabove, said partition having an opening therethrough adjacent to the vortex finder for the passage of the lighter phase therethrough into the compartment, and a conduit connected to the compartment to draw the lighter phase therefrom.

6 Claims, 14 Drawing Figures

DEVICE FOR SEPARATING MULTIPLE PHASE FLUID SYSTEMS ACCORDING TO THE RELATIVE SPECIFIC GRAVITIES OF THE PHASE

CROSS REFERENCE TO RELATED APPLICATION

This is a continuation of application Ser. No. 675,298, filed Apr. 9, 1976 now abandoned.

BACKGROUND OF THE INVENTION

The present invention relates to a device for separating multiple phase fluid systems according to the relative specific gravities of the phases and more particularly to such a device for separating gases or gases and particulate solids from a carrier fluid.

As evidenced by the applicant's U.S. Pat. No. 3,289,608 and No. 3,512,651, it has been known to separate solid particles from fluids in which they are carried by utilizing the velocity of such a fluid system to swirl the system in a vortex chamber. In this manner, sand, silt, clay and other foreign particles have been effectively removed from a carrying fluid so as to minimize the wear and clogging of meters, sprinklers, pumps, and other fluid handling equipment and to improve the quality of the fluid for washing, cooking, drinking, irrigation, sanitation and other purposes.

A long recognized companion problem has been the removal of gaseous components disolved in carrying liquids, such as methane in well water. The presence of such gaseous components has led to excessive wear, inefficient operation, and erratic behavior of pumps, inefficient meters, sprinklers, and other fluid handling equipment. The unintended and uncontrolled accumulation of inflamable gases has even constituted a hazard of substantial significance.

Not only have the difficulties incident to the presence of gaseous components in various fluids long been recognized, such problems usually have arisen in situations in which the removal of solid particles of impurities or contamination is also highly desirable. Insofar as the applicant is aware, prior to the present invention there has been no economical and efficient method or apparatus for removing gaseous components contained in a fluid, particularly where the fluid has been in a stream of substantial volume and no method or apparatus whatsoever has been known to the applicant for concurrently removing both solid particles and gaseous components from a fluid stream.

SUMMARY OF THE INVENTION

The broad essence of the present invention is, therefore, to provide an improved device for separating multiple phase fluid systems according to the relative specific gravities of the phases.

Another object of the invention is to provide a device for removing gaseous components from a fluid stream.

Another object is to provide such a device which not only separates the gaseous components from the fluid but segregates such components for subsequent use.

Another object is to provide a device for concurrently separating solid particles and gaseous components from a fluid stream.

Another object is to provide such a device that can be used on the suction side of a pump, so as to remove sand and gases from the intake side of the pump to protect the pump, or on the discharge side of the pump, so as to remove sand and gaseous components from its discharge to protect fluid handling equipment downstream therefrom and/or to achieve a discharge fluid of reduced solid and gaseous contamination.

A further object is to provide a device for swirling a fluid stream having relatively heavy, intermediate and light components so as to cause the heaviest components to be thrown outwardly and to descend, the lighter components to be drawn inwardly and to rise, and the intermediate components to be cleaned of both the heaviest and the lightest components.

Another object is to provide a device for separating solid particles from a fluid stream containing gaseous components by swirling the stream containing the particles and components so as to throw the particles outwardly to descend therefrom and to draw the gaseous components inwardly to rise therefrom.

Still further objects and advantages are to provide improved elements and arrangements thereof in a device for separating multiple phase fluid systems that is economical, durable, and fully effective in attaining its intended purposes.

BRIEF DESCRIPTIONS OF THE DRAWINGS

DESCRIPTION OF THE PREFERRED EMBODIMENT

First Form

Figure 1:
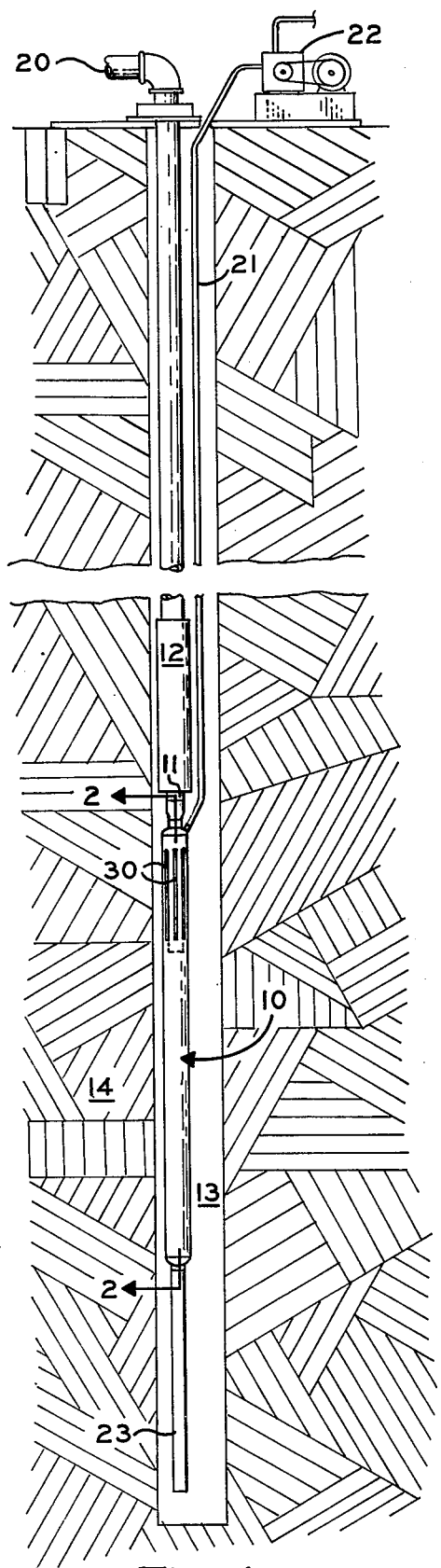
FIG. 1 is an axial section of a borehole and surrounding earth formation having a separating device of a first form of the present invention located therein shown in side elevation.
Figure 6:
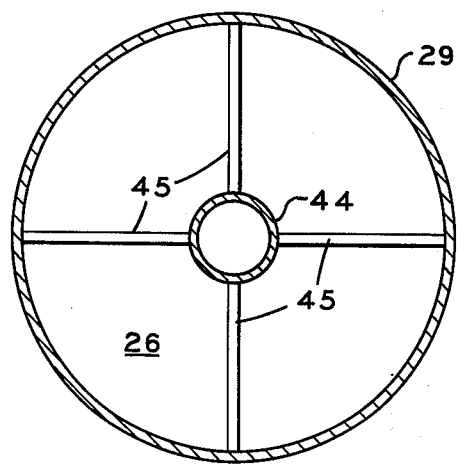
FIG. 6 is a horizontal section taken at the position indicated by line 6—6 of FIG. 2.
Figure 7:
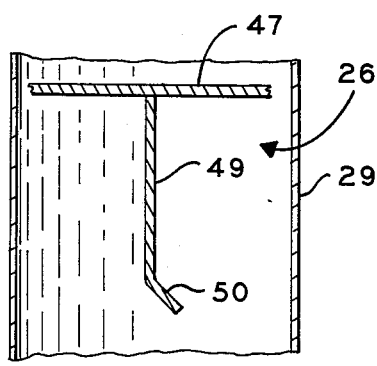
FIG. 7 is a fragmentary vertical section taken at the position indicated by line 7—7 in FIG. 2.
Figure 8:
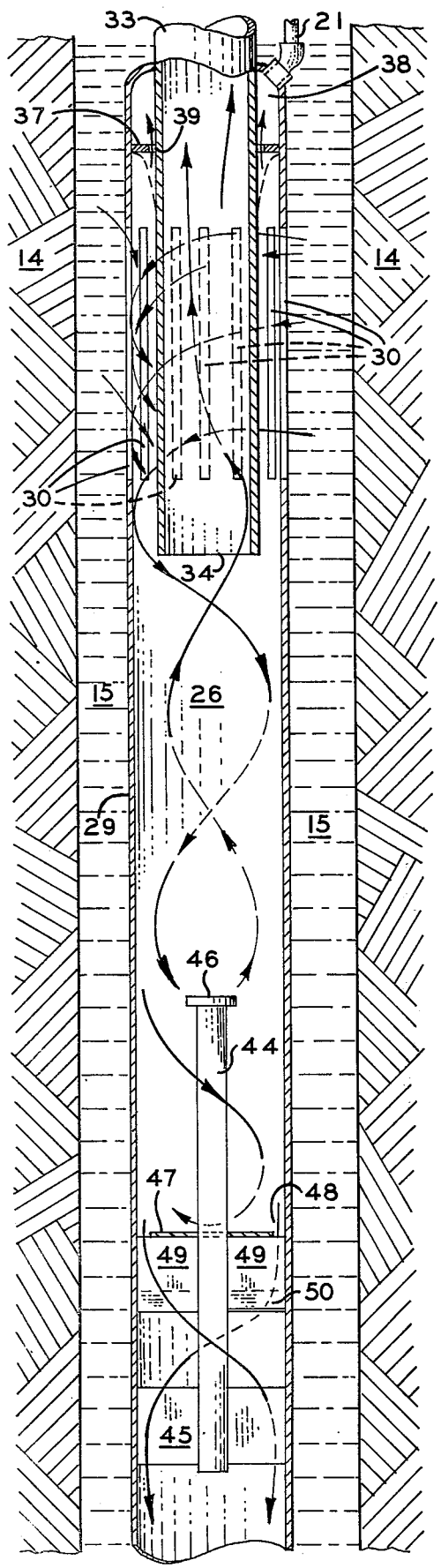
FIG. 8 is a fragmentary axial section of the borehole and its surrounding formation showing the separating device of the first form of the present invention in axial section with the fluid flow schematically represented therein.

The first form of the present invention is shown generally at 10 in FIGS. 1 through 8 and is adapted for connection to the intake 11 of a submersible pump 12. In FIGS. 1 and 8, the device is shown in operable position in a borehole 13 in a surrounding earth formation 14. It will be appreciated that the borehole 13 and formation 14 simply typify a characteristic operational environment and that the borehole may conveniently be a water well, an oil well, a sump, or any other source of a fluid system 15 containing solid particles and/or gaseous components in a carrying fluid.

As shown in FIG. 1, the device 10 is connected to the intake 11 of a pump 12 which provides a discharge conduit 20 extended to the top of the well for discharge at the surface or connection to any desired fluid receiving reservoir, accessory or apparatus, not shown. For reasons which will subsequently become apparent, a gas conduit 21 is connected eccentrically to the upper end of the device 10 and extended to the surface where it is connected to a gas pump 22. The device has a tail pipe 23 connected to the lower end thereof and downwardly extended in the borehole 13 to discharge solid particles at a position remote from the device 10.

Figure 2:
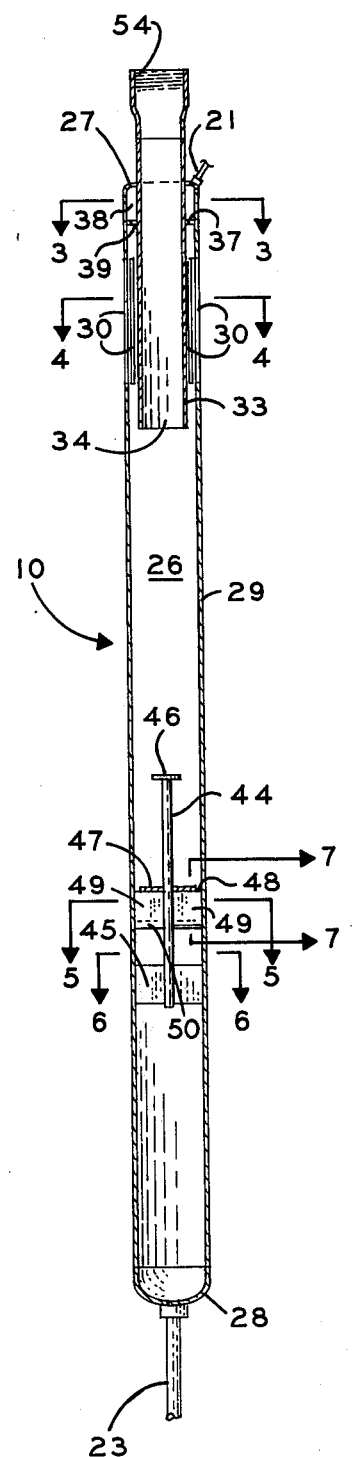
FIG. 2 is a somewhat enlarged vertical section of the separating device of FIG. 1, taken on line 2—2 thereof.
Figure 3:
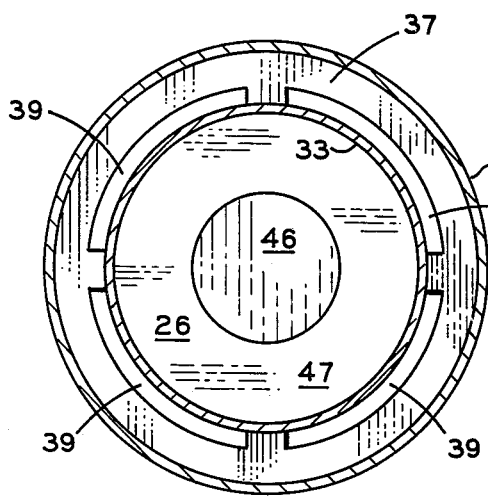
FIG. 3 is a horizontal section of the device of the first form taken at the position indicated by line 3—3 in FIG. 2.
Figure 4:
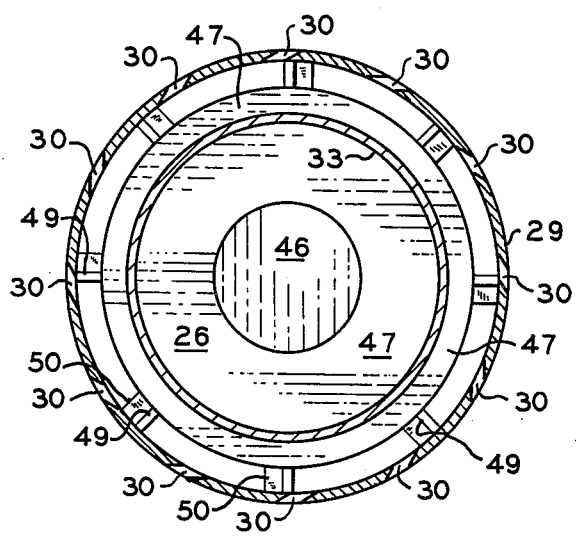
FIG. 4 is a horizontal section taken at the position indicated by line 4—4 of FIG. 2.

Referring to FIGS. 2 and 8, it will be seen that the first form of the device has a substantially cylindrical vortexing chamber 26 having substantially closed upper and lower ends 27 and 28, respectively, and a cylindrical side wall 29. In downwardly spaced adjacent relation to the upper end 27, the side wall is longitudinally slotted at 30 for the admission of the fluid of the well which in many instances is a three phase system consisting of water, sand particles and gas. As evident in FIG. 4, the slots are extended inwardly in tangential relation to a circle concentric to the chamber 26 to cause a swirling action of the fluid as it is admitted.

A cylindrical conduit 33 or vortex finder is extended through the upper end 27 of the vortexing chamber 26 and provides a downwardly extended open end 34 below the sots 30 and in downwardly spaced relation to said upper end of the chamber. For reasons which will be apparent, the vortex finder is disposed concentrically of the vortexing chamber.

A flat annular partition 37 circumscribes the vortex finder 33 in downwardly spaced relation to the upper end 27 of the vortexing chamber 26 and with the side wall 29 and closed upper end 27 forms an annular gas receiving compartment 38 in circumscribing relation to the vortex finder 33. Openings 39 are provided through the partition 37 adjacent to the vortex finder. It will be noted that the partition is above the upper ends of the slots 30. The gas conduit 21 is connected to the compartment 38, as shown in FIGS. 1, 2, and 8.

Figure 5:
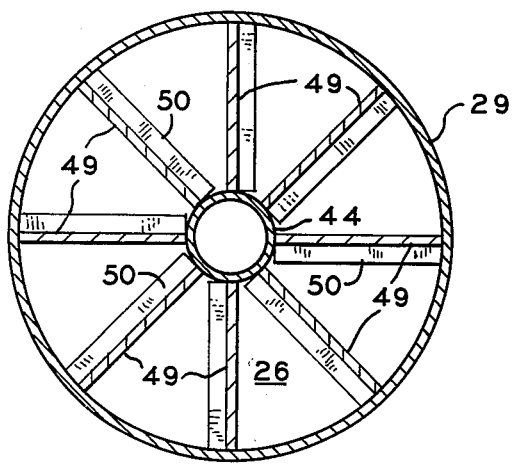
FIG. 5 is a horizontal section taken at the position indicated by line 5—5 in FIG. 2.

As best shown in FIGS. 2 and 6, a stand 44 is mounted concentrically of the wall 29 by erect, radial, planar brackets 45 weldably or otherwise secured to the wall 29 and to the stand. The upper end of the stand mounts a circular reaction plate 46 of a diameter substantially less than that of the side wall 29 concentrically of the side wall and downwardly spaced from the open lower end 34 of the vortex finder 33. A circular baffle plate 47 is preferably mounted concentrically on the stand 44 in downwardly spaced relation to the reaction plate 46. The baffle plate is of a diameter slightly less than that of the side wall 29 to provide an annular passage 48 therepast. The stand 44 is further supported by a plurality of erect, planar brackets 49 weldably or otherwise secured to the stand 44 and the side wall 29. It will be noted that the brackets 45 and 49 are disposed in planes which are radial to the stand 44. They thus serve to minimize swirling action of the fluid system as the heavier portions thereof pass downwardly in the vortexing chamber. To further inhibit the swirling action, the brackets 49 preferably have lower edges angularly extended from the planes of their respective brackets to form fins 50 directed in opposition to the swirling action, as shown in FIGS. 5 and 7. The tail pipe 23 is connected coaxially to the lower end 28 of the vortexing chamber 26. The upper end of the vortex finder 33 externally of the vortex chamber 26 is screw-threaded at 54 and connected to the intake 11 of the pump 12, as shown in FIG. 1.

SECOND FORM

Figure 9:
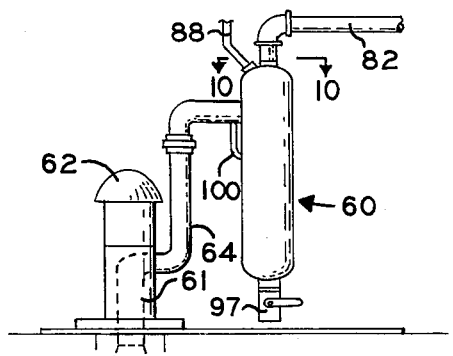
FIG. 9 is a side elevation of a pump having a discharge to which a second form of separating device of the present invention is connected.

The second form of the present invention is shown at 60 in FIGS. 9 through 13. In FIG. 9, a column pipe is shown at 61 having a motor 62 mounted thereabove to drive a turbine pump 63 located in the well. The pump has a discharge 64 connected to the column pipe in the second form of the present invention.

The device 60 has a substantially cylindrical outer housing 66 having hemispherically closed upper and lower ends 67 and 68. A vortexing chamber 76 having an upper end 77, a lower end 78 and a substantially cylindrical side wall 79 is mounted concentrically in the housing 66. A tubular vortex finder 80 is screw-threadably mounted in the upper end 67 of the housing and extended coaxially into the vortexing chamber 76. The finder has an open end 81 in downwardly spaced relation to the upper end 77 of the vortexing chamber. The vortex finder is connected to a discharge conduit 82.

A flat annular partition 85 circumscribes the vortex finder 80, is outwardly extended therefrom and is weldably or otherwise secured to the housing 66 with the upper end 77 of the vortexing chamber 76 secured in abutting relation thereto. The partition 85 is preferably disposed in a plane normal to the axis of the housing 66, vortexing chamber 76, and vortex finder 80 has openings 86 therethrough adjacent to the vortex finder. The partition 85, hemispherical upper end 67 of the housing 60 and the vortex finder 80 define an annular gas receiving compartment 87 in circumscribing relation to the vortex finder. A gas conduit 88 is connected to the compartment 87 and is either open to the atmosphere for the discarding of gas removed by the device or to any convenient storage facility, not shown.

In downwardly spaced relation to the partition 85 is a further partition 90 which with the upper end of the vortexing chamber 76, the partition 85, and the upper end of the housing 66 define a supply compartment 91 which circumscribes the upper end of the vortexing chamber.

Figure 10:
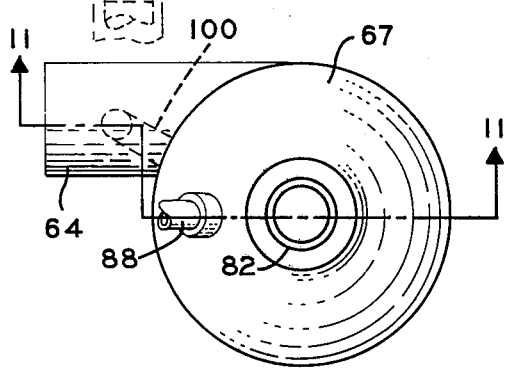
FIG. 10 is a transverse section of the second form of the present invention taken on line 10—10 in FIG. 9.
Figure 12:
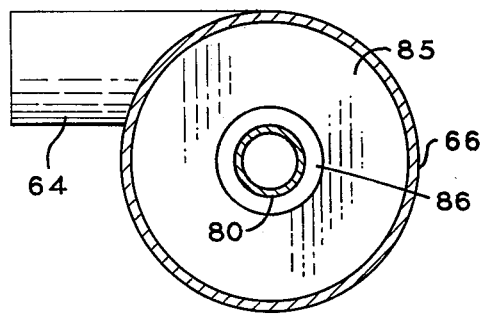
FIG. 12 is a horizontal section taken at the position indicated by line 12—12 of FIG. 11.
Figure 13:
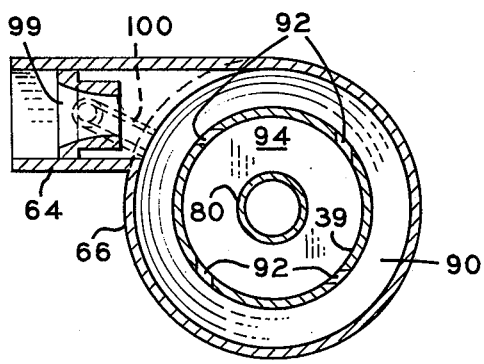
FIG. 13 is a horizontal section taken at the position indicated by line 13—13 in FIG. 11.

The discharge conduit 64 of the pump is connected to the upper end portion 67 of the housing 66 in tangential relation thereto so that water forced through the conduit by the pump enters the supply compartment 91 and swirls therein in a clockwise direction, as viewed in FIGS. 10, 12, and 13. A plurality of orifices 92 are formed through the upper end of the vortexing chamber in the supply compartment 87 tangential to a circle concentric to the vortex finder 80 to insure vigorous swirling action therein.

A reaction plate 94 is mounted on the lower end of the vortexing chamber 76 and in downwardly spaced relation thereto to provide an opening 95 through which fluid and solid particles can pass for descent in the housing 66.

The lower end 68 of the housing 66 is provided with a tail pipe 96 releasably closed by a valve 97. To maintain the fluid and particles in the lower end of the housing 66 as quiescent as possible, baffles 98 are preferably provided between the side wall 79 of the vortexing chamber 76 and the housing 66.

Figure 11:
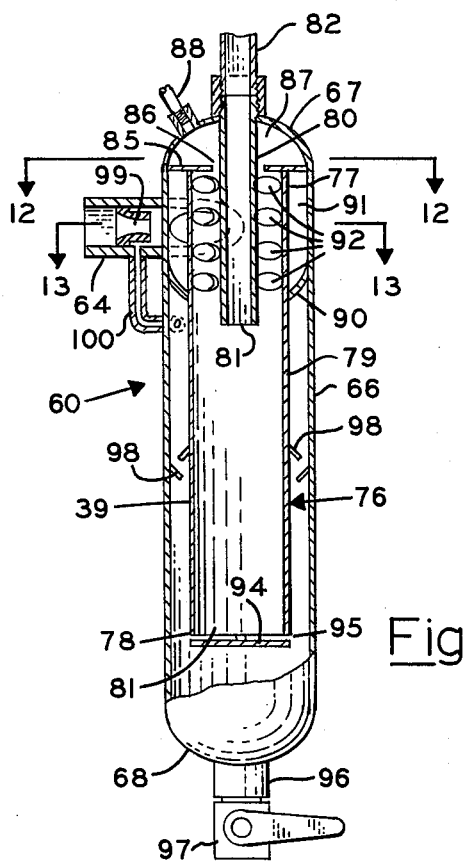
FIG. 11 is a longitudinal section of the separating device of the second form of the present invention taken on line 11—11 of FIG. 10.

As taught in applicants' U.S. Pat. No. 3,512,651, solid particles can descend in the vortexing chamber 76 and in the outer housing 66 more readily and with less turbulence if fluid is slowly removed therefrom to admit the particles. A very slow removal rate is adequate. As shown in FIG. 11, a venturi 99 is preferably provided in the conduit 64 and connected by a tube 100 to the compartment between the side wall 79 of the vortexing chamber and the housing 66.

THIRD FORM

Figure 14:
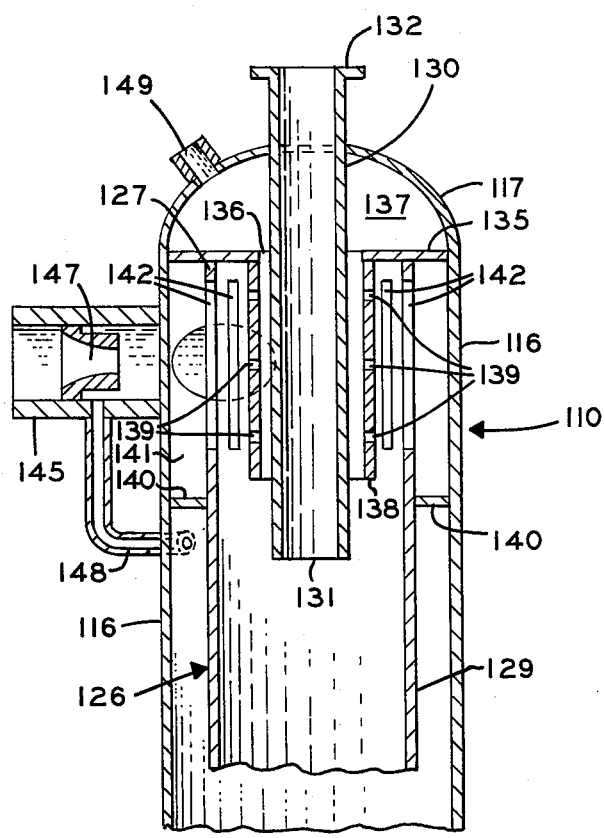
FIG. 14 is a fragmentary longitudinal section of a third form of the present invention.

The third form of the present invention is shown at 110 in FIG. 14. The third form is similar to the second form, being identical thereto in all portions not shown. The third form provides a cylindrical housing 116 having a hemispherically closed upper end 117 and a closed lower end, not shown. A cylindrical vortexing chamber 126 is mounted concentrically within the housing 116 and provides an upper end 127 in downwardly spaced relation to the upper end 117 of the housing and a lower end, not shown. The vortexing chamber has a cylindrical side wall 129. A tubular vortex finder 130 is mounted in the upper end 117 of the housing 116 and extended coaxially inwardly thereof to provide an open lower end 131 in downwardly spaced relation to the upper end 117 of the housing. The vortex finder has an upper end 132 adapted for connection to any suitable conduit or other fluid receiving accessory. A flat annular partition 135 is rigidly mounted in the upper end 117 of the housing 116 in circumscribing relation to the vortex finder 130. The partition has an inner edge in outwardly spaced relation to the vortex finder to define an annular opening 136 therebetween. The partition 135 with the upper end 117 of the housing 116 forms a gas collecting compartment 137 with which the opening 136 communicates. A cylindrical partition 138 is mounted in the annular opening 136 and downwardly extended therefrom in concentric spaced relation to the vortex finder 130. The cylindrical partition has orifices 139 therethrough. A further partition 140 circumscribes the vortexing chamber in downwardly spaced relation to the partition 135 and is weldably or otherwise secured to the housing 116 and to said vortexing chamber. The partition 140 housing 116, partition 135, and upper end of the vortexing chamber 126 define a supply compartment 141. The upper end portion of the vortexing chamber 126 is slotted at 142 within the supply compartment. The slots are extended through the side wall 129 of the vortexing chamber 126 tangentially to a circle concentric to the vortex finder 130.

A discharge 145 of a pump or of any other suitable source of fluid under pressure is connected tangentially to the housing 116 in communication with the supply compartment 141. As in the second form of the invention, a venturi 147 is preferably but not necessarily provided in the discharge 145 and connected by a tube 148 to the compartment between the housing 116 and the vortexing chamber 126 downwardly of the partition 140. A gas conduit 149 is connected to the compartment 137 at the upper end 117 of the housing 116.

OPERATION

The operation of the described embodiments of the present invention are believed to be clearly apparent and are briefly summarized at this point.

FIRST FORM

The operational environment for the first form 10 of the present invention involves a well or borehole 13 in a formation 14. A submersible pump 12 is located in the well beneath the surface of water therein. Such water is assumed to contain particles of solid material, such as sand, and/or gaseous components. Thus, the water in the well typifies a three phase fluid system from which it is desired to remove the solid components and the gaseous components prior to passage through the pump 12 in order to avoid their deleterious effect thereon. For example, it is well known that the presence of gas in the water leads to cavitation in the pump and accelerated pump wear.

When the pump 12 is operated, water is drawn inwardly through the slots 30 and swirls about the vortex finder 33 in the vortexing chamber 26. The water swirls downwardly past the lower end 34 of the vortex finder to the reaction plate 46 and thence swirls upwardly and out of the vortex finder 33. Such swirling causes sand and other particles of solid material to be thrown outwardly for descent along the side wall 29 into the lower end 28 of the vortexing chamber 26. As such particulate matter passes downwardly through the annular passage 48, past the baffle plate 47, and the planar brackets 45 and 49, the fins 50 virtually stop all swirling action in the lower end of the vortexing chamber so that the solid particulate matter can descend without turbulence.

The water drawn upwardly by the pump 12 is discharged through the conduit 20 having had substantially all of the particulate matter removed therefrom.

The particulate matter descends in the lower end 28 of the vortexing chamber 26, and thence through the tail pipe 23 for remote deposit in the borehole 13. When such disposition is intended, the tail pipe 23 is made of such length that the deposit of the sand and other particulate matter is in sufficiently spaced relation to the slots 30 as not to be drawn therein. Of course, such sand and other particulate matter can be drawn from the borehole by a supplementary pump, not shown, or caused to bypass the pump as in the applicant's U.S. Pat. No. 3,289,608.

Not only is the particulate matter removed from the water but as the three-phase system is drawn inwardly through the slots 30 and swirls in the vortexing chamber 26, the gas disolved or otherwise carried by the water is drawn inwardly and relative upwardly as the heavier components are thrown outwardly and downwardly. When the devices of the present invention are made of transparent material for study purposes, the swirling action can be seen to separate the gas from the water in a cone which circumscribes the vortex finder. The gas moves upwardly through the openings 39 into the compartment 38 and is drawn off by the pump 22 through the conduit 21.

Obviously, when desired, the device can be used to separate gas from a carrying fluid devoid of particulate matter. However, when a three phase system is involved, the combined removal of particulate matter and gas is highly desirable.

SECOND FORM

In contrast with the first form 10 of the present invention which is utilized on the suction side of a pump, the second form 60 and third form 110 are used on the discharge of a pump or other source of three phase fluid system under pressure.

Referring to FIGS. 9 through 13, when the pump 63 is operated, water containing solid particles and gaseous components is pumped through the conduit 64 and enters the housing 66 adjacent to the upper end 67 in tangential relation thereto and swirls within the supply compartment 91. The swirling water passes inwardly through the orifices 92 and continues its swirling motion in the vortexing chamber 76 where it descends to the reaction plate 94. During the swirling action, sand and other solid particles are thrown outwardly and descend along the side wall 79 and out the opening 95 into the lower end 68 of the housing. The water, continuing its swirling action, moves upwardly from the reaction plate 94 for passage out the lower end 81 of the vortex finder 80 and out the discharge conduit 82. The slow movement of fluid through the tube 100 to the venturi 99 for return of water for repeat travel through the device accomodates the gradual addition of sand and other particulate matter to the lower end 68 of the housing from which such material is periodically withdrawn by opening the valve 97.

As the water swirls in the upper end of the vortexing chamber 76, the gaseous components are drawn inwardly and upwardly from the water for passage through the openings 86 into the compartment 87 from which it passes through the conduit 88 for disposal into the atmosphere, storage, or utilization as desired. If it is desired simply to vent the compartment 87 to the atmosphere, the conduit 88 is extended upwardly to an elevation sufficient that the pressure of the incoming water through the conduit 64 does not force water through the conduit 88.

In the second form of the invention, the baffles 98 serve the same general purpose as the baffle plate 47 and the planar brackets 45 and 49 in the first form of the invention in that they aid in minimizing turbulence for more effective particulate component removal.

THIRD FORM

In the third form of the invention shown at 110 in FIG. 14, the water containing sand and other particulate matter and/or gaseous components, enters through the conduit 145 and swirls in the supply compartment 141. From the supply compartment, the two or three phase system passes through the slots 142 and swirls within the upper end portion of the vortexing chamber 126 about the cylindrical partition 138.

As before, the swirling action causes the particulate matter to be thrown outwardly for descent along the side wall 129. As the fluid swirls about the cylindrical partition 138, the liquid and particulate matter moves downwardly and a cone of gas forms about the cylindrical partition for passage of the gas through the orifices 139 and thence into the compartment 137 for release through the conduit 149. As before, the gas may be released to the atmosphere, stored, or utilized, as desired.

In many wells, the principal gaseous content carried by the water is methane, a valuable source of energy. Not only do the devices of the present invention permit the simultaneous or independent removal of particulate and gaseous components from fluid to shield pumps, meters, sprinklers and other fluid handling equipment from damage, they permit the salvage of such gaseous components as methane, helium, and the like for subsequent utilization.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. In combination with a pump for liquids having an intake disposed in a well containing a three phase fluid system including a gaseous phase, a liquid phase and a particulate solid phase, a device for protecting the liquid pump from the passage of the gaseous phase and the particulate solid phase therethrough comprising:
   A. a vortexing chamber immersed in the fluid system in the well having upper and lower end walls and a sidewall defining a surface of revolution concentric to an axis disposed longitudinally of the well;
   B. a substantially cylindrical vortex finder connected to the intake of said pump mounted in the upper end wall of the chamber and extended concentrically axially downwardly in the chamber having an open lower end intermediate the upper and lower end walls of the chamber;
   C. a partition circumscribing the vortex finder mounted on the sidewall in downwardly spaced relation to the upper end wall of the chamber to define a compartment for collecting gas thereabove in the chamber, said partition having a gas passage therethrough adjacent to the vortex finder to admit gas to the compartment and being substantially impervious outwardly thereof;
   D. means in the sidewall for directing the fluid system of the well into the vortexing chamber tangentially to a circle concentric to the axis thereof at an elevation below the passage in response to operation of the pump whereby the fluid swirls downwardly in the chamber in a centrifuging action throwing solid particles outwardly for gravitational descent to the lower end of the chamber, the gaseous components swirl inwardly and upwardly for movement through the passage into the gas collecting compartment, and said fluid having had solid particles and gaseous components centrifuged therefrom swirls downwardly and then upwardly through the lower end of the vortex finder;
   E. a gas pump for drawing gas from the compartment having an intake connected to the compartment and a discharge at the surface of the well; and
   F. a tail pipe for drawing solid particles from the chamber mounted on the lower end wall in communication with the vortexing chamber and downwardly extended therefrom.

2. A device for separating a three phase fluid system in a well, which system contains at least three phases of different specific gravities including a lightest gaseous phase comprising:
   A. a pump having an intake disposed in a well;
   B. a vortexing chamber immersed in the fluid system in the well having upper and lower end walls and a sidewall defining a surface of revolution concentric to a substantially erect axis;
   C. means in the sidewall in spaced relation to the upper end wall of the chamber for admitting such a fluid system into the vortexing chamber tangentially to a circle concentric to the axis;
   D. a substantially cylindrical vortex finder connected to the intake of the pump mounted in the upper end wall of the chamber and extended downwardly substantially concentrically of the sidewall thereof having an open lower end in downwardly spaced relation to the upper end wall and in upwardly spaced relation to the lower end wall;

E. a partition mounted on the sidewall of the vortexing chamber in downwardly spaced relation to the upper end wall and defining a gas receiving compartment therebetween within the chamber, said partition being in upwardly spaced relation to the lower end of the vortex finder and having a gas passage therethrough immediately adjacent to the vortex finder communicating with the gas receiving compartment;

F. a gas pump for drawing gas from the compartment having an intake connected to the gas receiving compartment; and G. a tail pipe for drawing the heaviest phase from the chamber mounted in the lower end wall in communication with said vortexing chamber and having a lower outlet end in the well in downwardly spaced relation to the vortexing chamber.

3. A device for separating a three phase fluid system in a well, which system contains at least three phases of different specific gravities including a lightest gaseous phase comprising:

A. a pump having an intake disposed in a well;

B. a vortexing chamber immersed in the fluid system in the well having upper and lower end walls and a sidewall defining a surface of revolution concentric to a substantially erect axis;

C. means in the sidewall in spaced relation to the upper end wall of the chamber for admitting such a fluid system into the vortexing chamber tangentially to a circle concentric to the axis;

D. a substantially cylindrical vortex finder connected to the intake of the pump mounted in the upper end wall of the chamber and extended downwardly substantially concentrically of the sidewall thereof having an open lower end in downwardly spaced relation to the upper end wall and in upwardly spaced relation to the lower end wall;

E. a partition mounted on the sidewall of the vortexing chamber in downwardly spaced relation to the upper end wall and defining a gas receiving compartment therebetween within the chamber, said partition being in upwardly spaced relation to the lower end of the vortex finder and having a gas passage therethrough immediately adjacent to the vortex finder communicating with the gas receiving compartment;

F. a conduit for drawing gas from the compartment having an intake connected to the compartment and a discharge upwardly spaced therefrom; and G. a tail pipe for drawing the heaviest phase from the chamber mounted in the lower end wall in communication with the vortexing chamber and having a lower outlet end in the well in downwardly spaced relation to the vortexing chamber.

4. In combination with a pump having an intake disposed in a well containing a three phase fluid system including a gaseous phase, a liquid phase and a particulate solid phase, a device for protecting the liquid pump from the passage of the gaseous phase and the particulate solid phase therethrough comprising:

A. a vortexing chamber immersed in the fluid system in the well having upper and lower end walls and a sidewall defining a surface of revolution concentric to an axis disposed longitudinally of the well;

B. a substantially cylindrical vortex finder connected to the intake of said pump mounted in the upper end wall of the chamber and extended concentrically axially downwardly in the chamber having an open lower end in downwardly spaced relation to the upper end wall of the chamber;

C. a partition mounted on the sidewall in circumscribing relation to the vortex finder intermediate the upper end wall of the chamber and the lower end of the vortex finder defining a compartment for collecting gas thereabove in the chamber, said partition having a gas passage therethrough adjacent to the vortex finder to admit gas to the compartment;

D. means in the sidewall below the partition for directing the fluid system of the well into the vortexing chamber tangentially to a circle concentric to the axis thereof in response to operation of the pump whereby the fluid swirls downwardly in the chamber in a centrifuging action throwing solid particles outwardly for gravitational descent to the lower end of the chamber, the gaseous components swirl inwardly and upwardly through the gas passage into the gas collecting compartment, and said fluid having had solid particles and gaseous components centrifuged therefrom swirls downwardly and then upwardly through the lower end of the vortex finder;

E. a conduit for drawing gas from the compartment having an intake connected to the compartment and a discharge upwardly spaced therefrom; and F. a tail pipe for drawing solid particles from the chamber mounted on the lower end wall in communication with the vortexing chamber and downwardly extended therefrom.

5. In combination with a pump having an intake disposed in a well containing a multiple phase fluid system in which the phases are of different specific gravities and include a gaseous phase, a device for protecting the pump from the passage of the gaseous phase therethrough comprising:

A. a vortexing chamber immersed in the fluid system in the well having an upper end wall and a sidewall defining a surface of revolution concentric to an axis disposed longitudinally of the well;

B. a substantially cylindrical vortex finder connected to the intake of said pump mounted in the upper end wall of the chamber and extended concentrically axially downwardly in the chamber having an open lower end downwardly spaced from the upper end wall of the chamber;

C. a partition mounted on the sidewall in circumscribing relation to the vortex finder intermediate the upper end wall of the chamber and the lower end of the vortex finder defining a compartment for collecting gas thereabove in the chamber, said partition having a gas passage therethrough adjacent to the vortex finder to admit gas to the compartment;

D. means in the sidewall for directing the fluid of the well into the vortexing chamber tangentially to a circle concentric to the axis thereof at an elevation below the partition and above the lower end of the vortex finder in response to operation of the pump whereby the liquid phase swirls downwardly in the chamber and thence upwardly through the vortex finder and the gaseous phase swirls inwardly and upwardly into the gas receiving compartment; and E. a conduit for drawing gas from the compartment having an intake connected to the compartment and a discharge upwardly spaced therefrom.

6. A device for separating a three phase fluid system containing at least three phases of different specific gravities including a lightest gaseous phase comprising:
 A. a vortexing chamber having upper and lower end walls and a sidewall defining a surface of revolution concentric to an upwardly extended axis;
 B. a substantially cylindrical vortex finder mounted in the upper end wall of the chamber and extended downwardly in the chamber substantially concentrically of the sidewall having an open lower end in downwardly spaced relation to the upper end wall of the vortexing chamber and an upper end above the upper end wall of the vortexing chamber;
 C. a partition mounted on the sidewall of the vortexing chamber in downwardly spaced relation to the upper end wall thereof and defining a gas receiving compartment therebetween within the chamber, said partition being in upwardly spaced relation to the lower end of the vortex finder and having a gas passage therethrough immediately adjacent to the vortex finder communicating with the gas receiving compartment;
 D. fluid directing means in the sidewall below the partition but above the lower end of the vortex finder disposed tangentially to a circle concentric to said axis;
 E. means for supplying such a three phase fluid system to the fluid directing means at a pressure greater than the pressure at the upper end of the vortex finder whereby the fluid swirls downwardly in the chamber in a centrifuging action throwing solid particles outwardly for gravitational descent to the lower end of the chamber, the gaseous components swirl inwardly and upwardly for movement through the passage into the gas collecting compartment, and said fluid having had solid particles and gaseous components centrifuged therefrom swirls downwardly and then upwardly through the lower end of the vortex finder;
 F. means connected to the compartment for drawing gas therefrom; and
 G. means connected to the lower end of the chamber for drawing particles therefrom.

* * * * *

UNITED STATES PATENT AND TRADEMARK OFFICE
CERTIFICATE OF CORRECTION

PATENT NO. : 4,072,481
DATED : February 7, 1978
INVENTOR(S) : Claude C. Laval, Jr.

It is certified that error appears in the above—identified patent and that said Letters Patent are hereby corrected as shown below:

Column 3, line 17, delete "donwardly" and insert

---downwardly---.

Column 3, line 35, delete "sots" and insert ---slots---.

Signed and Sealed this

Sixth Day of June 1978

[SEAL]

Attest:

RUTH C. MASON
Attesting Officer

DONALD W. BANNER
Commissioner of Patents and Trademarks